(12) United States Patent
Fukushima et al.

(10) Patent No.: US 11,558,517 B2
(45) Date of Patent: Jan. 17, 2023

(54) IMAGE READING APPARATUS AND IMAGE FORMING APPARATUS

(71) Applicant: CANON KABUSHIKI KAISHA, Tokyo (JP)

(72) Inventors: Takayuki Fukushima, Ibaraki (JP); Yuichi Yamamoto, Ibaraki (JP); Takuma Nakamura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 74 days.

(21) Appl. No.: 17/328,291

(22) Filed: May 24, 2021

(65) Prior Publication Data

US 2021/0377407 A1   Dec. 2, 2021

(30) Foreign Application Priority Data

Jun. 1, 2020 (JP) .............................. JP2020-095453

(51) Int. Cl.
*H04N 1/00* (2006.01)
*B65H 31/02* (2006.01)
(Continued)

(52) U.S. Cl.
CPC ........... *H04N 1/00631* (2013.01); *B65H 1/04* (2013.01); *B65H 3/0661* (2013.01); *B65H 31/02* (2013.01); *B65H 31/36* (2013.01); *B65H 2404/73* (2013.01); *B65H 2405/1115* (2013.01); *B65H 2405/1117* (2013.01); *B65H 2405/11152* (2013.01); *B65H 2405/11171* (2013.01); *B65H 2405/3321* (2013.01);
(Continued)

(58) Field of Classification Search
CPC   B65H 2405/11171; B65H 2405/11163; B65H 2405/1115; B65H 2405/354; B65H 31/34; B65H 2404/73; B65H 2405/1117; H04N 1/00631
See application file for complete search history.

(56) References Cited

U.S. PATENT DOCUMENTS 7,686,294 B2 * 3/2010 Moore .................... B65H 1/18
271/148
2007/0020007 A1   1/2007 Azuma

FOREIGN PATENT DOCUMENTS

JP        H0772685 A     3/1995
JP        2000194234 A   7/2000
(Continued)

*Primary Examiner* — Jeremy R Severson
(74) *Attorney, Agent, or Firm* — Canon U.S.A., Inc. I.P. Division (57) ABSTRACT

An image reading apparatus includes a stacking unit having an abutment portion, a feeding unit, a conveyance unit, a reading unit, a rotating shaft, and a drive unit. The abutment portion abuts a document end in a widthwise direction of a document stacked on the stacking unit. The conveyance unit conveys the stacked document fed by the feeding unit in a feeding direction perpendicularly intersecting the document widthwise direction. The reading unit reads an image of the document. The drive unit rotates the stacking unit, rotatably supported by the rotating shaft, around the rotating shaft. The rotating shaft is disposed at a position where at least a part of the rotating shaft exists between one end and other end in the document widthwise direction of a document having a maximum width conveyable by the conveyance unit in a state where the maximum width document abuts on the abutment portion.

13 Claims, 7 Drawing Sheets

(51) Int. Cl.
 B65H 31/36 (2006.01)
 B65H 1/04 (2006.01)
 B65H 3/06 (2006.01)
(52) U.S. Cl.
 CPC .... *B65H 2405/354* (2013.01); *B65H 2511/12* (2013.01); *B65H 2511/20* (2013.01); *B65H 2511/214* (2013.01); *B65H 2511/515* (2013.01); *B65H 2513/52* (2013.01); *B65H 2601/325* (2013.01); *B65H 2801/39* (2013.01)

(56) References Cited

FOREIGN PATENT DOCUMENTS

| | | |
|---|---|---|
| JP | 2003-323084 A | 11/2003 |
| JP | 2007230670 A | 9/2007 |

\* cited by examiner

IMAGE READING APPARATUS AND IMAGE FORMING APPARATUS

BACKGROUND

Field

The present disclosure relates to an image reading apparatus that reads an image of a document, and an image forming apparatus including the image reading apparatus.

Description of the Related Art

An image reading apparatus included in scanners and copying machines is conventionally provided with an automatic document feeder (hereinafter referred to as an ADF) that successively feeds documents stacked on a document tray, conveys each document to an image reading position, reads an image of the document, and discharges the document to a discharge tray. Among the ADFs are configured to align documents in the widthwise direction by a user operation of placing documents on a horizontal document tray and operating a side regulation plate provided on the document tray.

Alternatively, to omit a user operation using the side regulation plate, a technique for aligning documents by the documents' own weight with a document tray that is inclined to a front side at a user's document setting operation is known. In a configuration discussed in Japanese Patent Application Laid-Open No. 7-072685, a document tray is rotatably supported around a rotating shaft, and the document tray can be inclined to the front side when the user sets documents.

As another technique for an ADF configured to incline a document tray to the front side, a technique discussed in Japanese Patent Application Laid-Open No. 2003-323084 for enabling a user to view a document stacking surface of a document tray even from a low viewpoint position is known. More specifically, when the user having a low viewpoint position changes an inclination angle of an operation panel unit for easier viewing, an inclination angle of the document tray is automatically changed.

A torque for rotating the document tray of the ADF largely depends on a position of the rotating shaft, a position of the center of gravity of the document tray, and a position of the center of gravity of documents set to the document tray. When a torque for rotating the document tray increases, a drive source increases in size is also required. This results in an increase in apparatus size. Thus, it is desirable that small torque be used to rotate the document tray.

However, in the configuration discussed in Japanese Patent Application Laid-Open No. 7-072685, the rotating shaft as the rotation center is disposed at the front side end of the document tray. More specifically, the rotation center is at a position apart from the center of gravity of the document tray and the center of gravity of documents set to the document tray. Consequently, when the document tray is rotated in a state where documents are set on the document tray, a torque for rotating the document tray and documents set to the document tray increases.

In the configuration discussed in Japanese Patent Application Laid-Open No. 2003-323084, the rotating shaft as the rotation center is disposed at an rear side end of the document tray. This consequently increases the torque for rotating the document tray and documents set to the document tray.

SUMMARY

The present disclosure is directed towards downsizing an image reading apparatus, and an image forming apparatus including the image reading apparatus, by reducing a torque for rotating a document tray.

According to an aspect of the present disclosure, an image reading apparatus includes a stacking unit having a stacking surface on which a document is to be stacked, and an abutment portion on which an end of the document in a widthwise direction of the document stacked on the stacking surface abuts, a feeding unit configured to feed the stacked document in a feeding direction perpendicularly intersecting the document widthwise direction, a conveyance unit including a plurality of conveyance rollers configured to convey the document fed by the feeding unit, a reading unit configured to read an image of the document conveyed by the conveyance unit, a rotating shaft extended in the feeding direction and configured to rotatably support the stacking unit, and a drive unit configured to rotate the stacking unit around the rotating shaft, wherein, in the document widthwise direction, the rotating shaft is disposed at a position where at least a part of the rotating shaft exists between one end and other end in the document widthwise direction of a document having a maximum width conveyable by the conveyance unit in a state where the maximum width document abuts on the abutment portion.

Further features of the present disclosure will become apparent from the following description of exemplary embodiments with reference to the attached drawings.

DESCRIPTION OF THE EMBODIMENTS

Preferred exemplary embodiments of the present disclosure will be described below with reference to the accompanying drawings.

Configuration of Image Forming Apparatus 101

Figure 1:
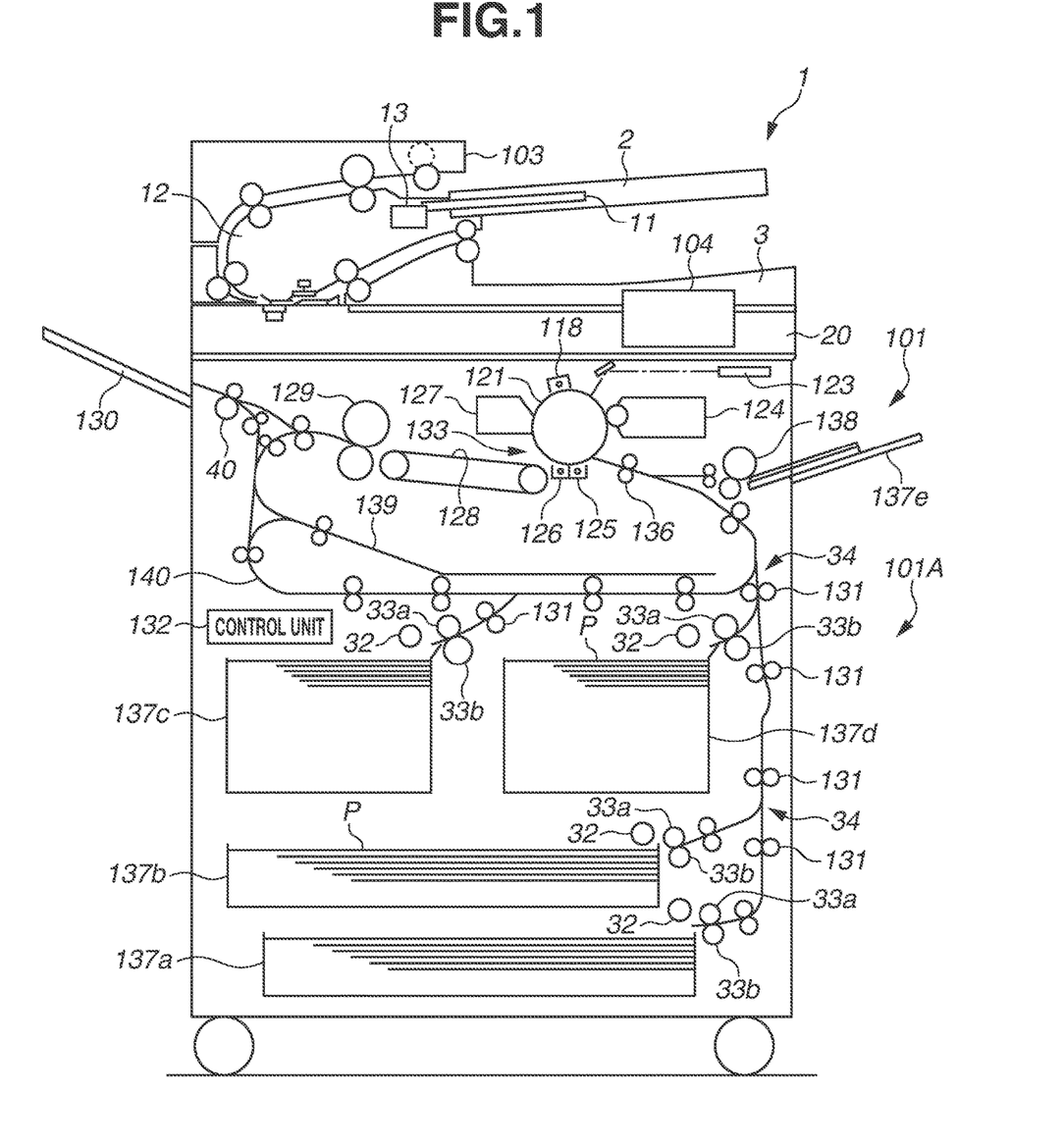
FIG. 1 is a cross-sectional view illustrating an image forming apparatus according to the present exemplary embodiment.

The overall configuration of an image forming apparatus 101 according to the present exemplary embodiment will be described below with reference to FIG. 1. FIG. 1 is a cross-sectional view illustrating the image forming apparatus 101 according to the present exemplary embodiment. In the following descriptions, a position where a user faces an operation unit 104 for performing various input/setting operations on the image forming apparatus 101 is referred to as the "front side" of the image forming apparatus 101, and a rear face side is referred to as the "rear side" of the image forming apparatus 101. More specifically, FIG. 1 illustrates the internal configuration of the image forming apparatus 101 when viewed from the front side.

The image forming apparatus 101 includes an apparatus main body 101A and an image reading apparatus 103, as illustrated in FIG. 1. The image reading apparatus 103 disposed on the top of the apparatus main body 101A includes a reader 20 and an automatic document feeder (hereinafter referred to as an ADF) 1 (described in detail below). The image reading apparatus 103 optically scans a document D to read image information. The document D is paper, such as a print sheet and an envelope, a plastics film, such as an overhead projector (OHP) sheet, and a sheet, such as a cloth. The image information converted into an electrical signal by the image reading apparatus 103 is transferred to a control unit 132 illustrated in FIG. 6 (described below) included in the apparatus main body 101A. The apparatus main body 101A forms an image on a sheet P as a recording material, based on the image read by the image reading apparatus 103.

The apparatus main body 101A includes an image forming unit 133 that forms an image on the sheet P as a recording material, and a sheet feeding unit 34 that feeds the sheet P to the image forming unit 133. The sheet feeding unit 34 includes sheet storage units 137a, 137b, 137c, and 137d capable of storing sheets with different sizes. A sheet stored in the sheet storage units 137a, 137b, 137c, and 137d is picked up by a pickup roller 32, separated from other sheets by a feed roller 33a and a retard roller 33b, and then transferred to a corresponding conveyance roller pair 131. Then, the sheet P is successively transferred to a plurality of conveyance roller pairs 131 disposed along the sheet conveyance path and then conveyed to a registration roller pair 136.

A sheet P placed on a manual feed tray 137e by the user is fed to the inside of the apparatus main body 101A by a feed roller 138 and then conveyed to the registration roller pair 136. The registration roller pair 136 stops a leading edge of the sheet P to correct skew, and restarts conveying the sheet P in synchronization with progress of an image forming operation for a toner image forming process by the image forming unit 133.

The image forming unit 133 that forms an image on the sheet P is an electrophotographic image forming unit including a photosensitive drum 121 as a photosensitive member. The photosensitive drum 121 can rotate along the conveyance direction of the sheet P. A charging device 118, an exposure device 123, a development device 124, a transfer charging device 125, a separation charging device 126, and a cleaner 127 are disposed around the photosensitive drum 121. The charging device 118 uniformly charges the surface of the photosensitive drum 121. The exposure device 123 exposes the photosensitive drum 121 to light, based on image information input from the image reading apparatus 103, to form an electrostatic latent image on the photosensitive drum 121.

The development device 124 including developer containing toner develops the electrostatic latent image into a toner image by supplying charged toner to the photosensitive drum 121. The toner image borne by the photosensitive drum 121 is transferred onto the sheet P conveyed from the registration roller pair 136 by a bias electric field formed by the transfer charging device 125. The sheet P with the toner image transferred thereon is separated from the photosensitive drum 121 by a bias electric field formed by the separation charging device 126, and then conveyed to a fixing unit 129 by a pre-fixing conveyance unit 128. An adhering substance, such as residual toner, on the photosensitive drum 121 (toner untransferred onto the sheet P) is removed by the cleaner 127. Then, the photosensitive drum 121 prepares for the next image forming operation.

The sheet P conveyed to the fixing unit 129 is subjected to fixing processing including pressurization and heating of the toner image, while being held and conveyed by roller pairs. After toner melts and then firmly sticks to the sheet P, the image is fixed to the sheet P. When image output is completed, the sheet P having a fixed image is discharged to a discharge tray 130 that projects to the outside of the apparatus main body 101A, via a discharge roller pair 40. When forming an image on the back surface of the sheet P in double-sided printing, the sheet P that passed through the fixing unit 129 is reversed by a reversing unit 139, and then conveyed to the registration roller pair 136 by a double-sided conveyance unit 140. Then, the sheet P with another image formed thereon again by the image forming unit 133 is discharged to the discharge tray 130.

The above-described image forming unit 133 is an example of an image forming unit. For example, an ink-jet image forming unit or an offset printing mechanism may be used as the image forming unit 133.

Configuration of Image Reading Apparatus 103

Figure 2:
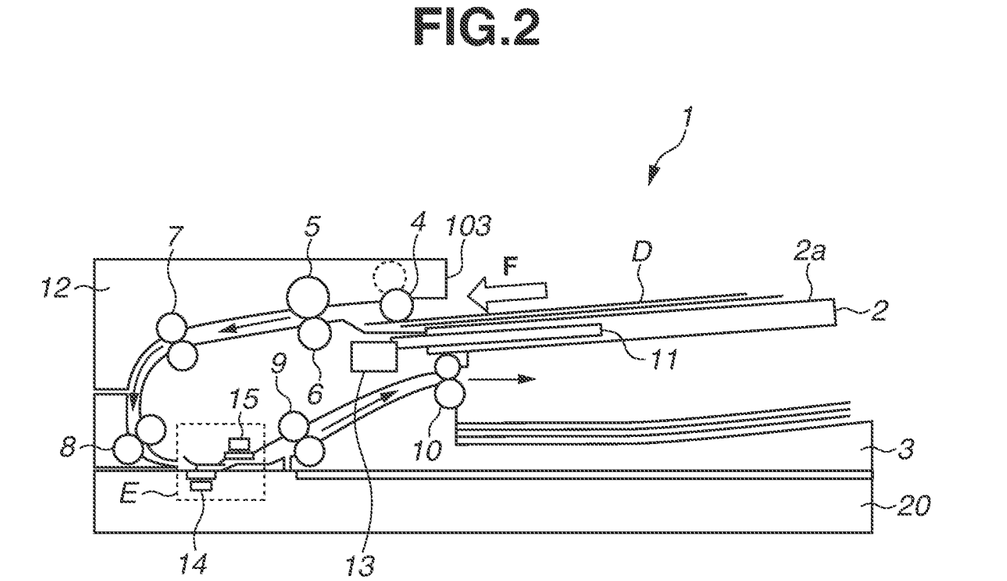
FIG. 2 is a cross-sectional view illustrating an image reading apparatus according to the present exemplary embodiment.

The overall configuration of the image reading apparatus 103 will be described below with reference to FIG. 2. FIG. 2 is a cross-sectional view illustrating the image reading apparatus 103. Sizes, materials, shapes, and relative arrangements of elements described in the following exemplary embodiments are not limited thereto. Unless otherwise specifically described, the scope of the present disclosure is not limited to the exemplary embodiments described below.

As illustrated in FIG. 2, an ADF 1 includes a document tray 2, a conveyance unit 12, and a discharge tray 3. The ADF 1 is attached to be openable and closable to the upper surface of the reader 20. The ADF 1 conveys the document D to a reading position on the document feeding-reading glass disposed on the upper surface of the reader 20. A document D is set to the document tray 2 as the stacking unit disposed on the ADF 1. The document tray 2 is supported by a rotating shaft 11 extending along a feeding direction F, to be rotatable with respect to the conveyance unit 12. The feeding direction F according to the present exemplary embodiment is a direction in which the document D is fed by a feed roller 4 (described below) and a direction along a document stacking surface 2a at the time of feeding. The feeding direction F perpendicularly intersects a widthwise direction of the document tray 2 at the time of feeding. The widthwise direction is the main scanning direction when the image reading apparatus 103 reads an image of the document D.

The document tray 2 is supported by the rotating shaft 11 to be rotatable with respect to the conveyance unit 12. Since the document tray 2 is fixed to the rotating shaft 11, the rotation of the rotating shaft 11 integrally rotates the document tray 2. The document tray 2 is rotated by a driving force of a motor 13 as a drive unit. While, in the present exemplary embodiment, the motor 13 is disposed inside the conveyance unit 12, the arrangement of the motor 13 is not limited thereto. For example, the motor 13 may be disposed inside the document tray 2 or disposed on a side of a drive unit for applying a rotational driving force to each conveyance roller (described below).

The ADF 1 is provided with feed rollers 4 and 5, a separation roller 6, conveyance roller pairs 7, 8, and 9, and a discharge roller pair 10. An image reading section E is disposed on a downstream side of the conveyance roller pair 8 in the conveyance direction. The image reading section E includes a front surface reading unit 14 disposed on the reader 20, and a back surface reading unit 15 disposed on the ADF 1.

The document D on the document tray 2 is sent to the feed roller 5 by a rotational driving force of the feed roller 4 as a feeding unit. The document D is separated one by one by the friction between the feed roller 5 and the separation roller 6 urged from below by a spring. The separated document D is sent to the image reading section E by a rotational driving force of the conveyance roller pairs 7 and 8. The document D having been sent to the image reading section E is subjected to image reading on both surfaces by the front surface reading unit 14 and the back surface reading unit 15 as reading units. Then, the document D is conveyed to the discharge roller pair 10 by the conveyance roller pair 9 and discharged to the discharge tray 3 by the discharge roller pair 10.

Configuration of Document Tray 2

Figure 3:
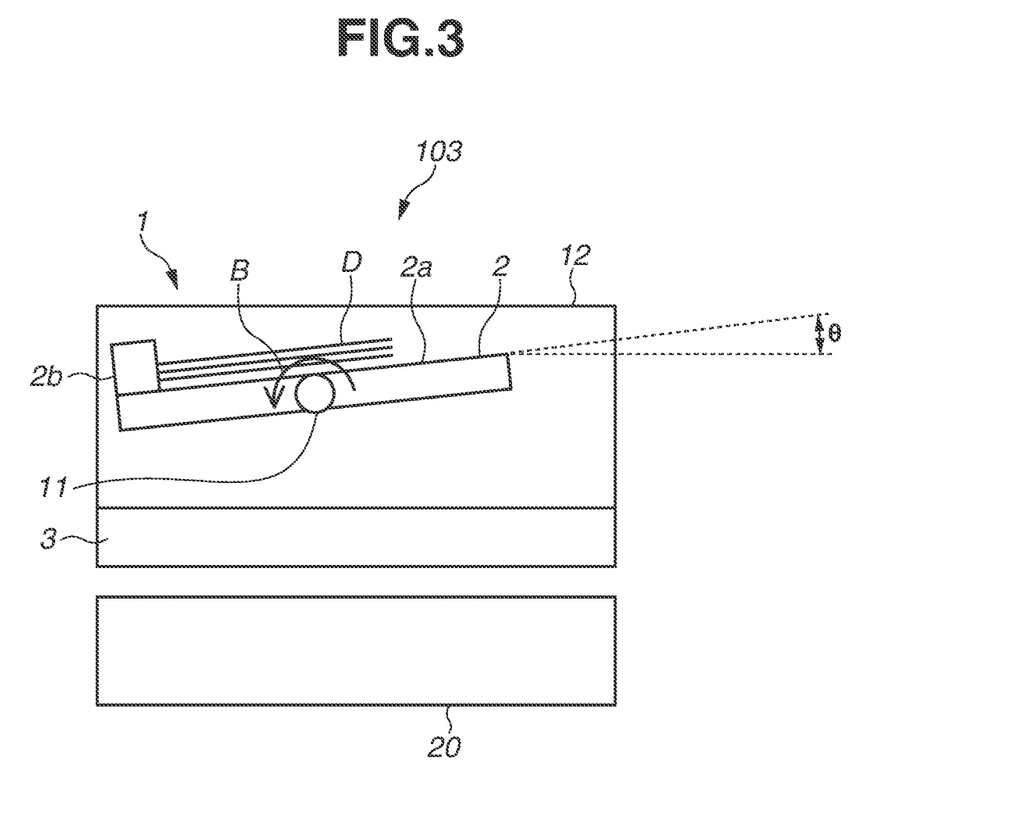
FIG. 3 is a right side view illustrating a state where a document is set in the image reading apparatus according to the present exemplary embodiment.
Figure 4:
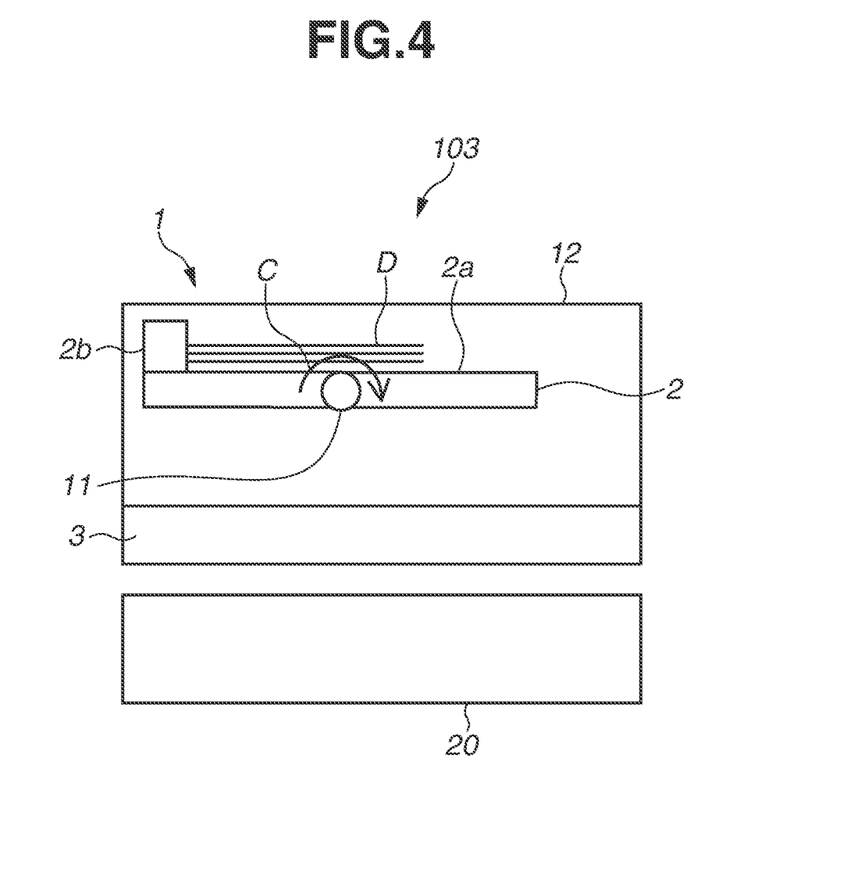
FIG. 4 is a right side view illustrating a state where the document is fed in the image reading apparatus according to the present exemplary embodiment.

The configuration of the document tray 2 will be described below with reference to FIGS. 3 and 4. FIG. 3 illustrates a state of the document tray 2 when documents D are set. FIG. 4 illustrates a state of the document tray 2 when the set document D is fed.

As illustrated in FIG. 3, the document tray 2 includes a document stacking surface 2a and a document abutment portion 2b as a stop member. The document abutment portion 2b is fixed to the document tray 2 on a side of the operation unit 104 (front side). When the user sets documents D, the user rotates the document tray 2 to the front side around the rotating shaft 11 to incline the document tray 2 to the front side. More specifically, the document tray 2 rotates in the direction of an arrow B illustrated in FIG. 3. The user sets the documents D in a first state (the state illustrated in FIG. 3) where the document tray 2 is inclined to the front side. When viewed from the direction along the feeding direction F, since the document stacking surface 2a is inclined to the front side by an angle $\theta$ with respect to the horizontal direction, the documents D set by the user move to the front side by their own weight. Since the document abutment portion 2b is disposed on the front side of the document tray 2, a widthwise end of documents D moved by their own weight abuts the document abutment portion 2b, and thus the documents D are aligned. This enables skipping the conventional action to align the documents D, which has been intentionally performed by the user, making it easier to set the documents D. In a state where the document stacking surface 2a is inclined by the angle $\theta$ with respect to the horizontal direction, the document stacking surface 2a is not smoothly connected with the conveyance path of the conveyance unit 12. More specifically, the downstream end of the document stacking surface 2a in the feeding direction F deviates from the upstream end of a guide that forms the conveyance path of the conveyance unit 12. Therefore, the ADF 1 cannot perform the feeding operation in the first state where the document tray 2 is inclined to the front side.

Although the angle $\theta$ is 30 degrees according to the present exemplary embodiment, the angle $\theta$ is not limit thereto but may be $0<\theta<40$. The upper limit of the angle $\theta$, 40 degrees, is the maximum inclination angle at which the set document D abutting on the document abutment portion 2b does not bend. According to the present exemplary embodiment, a length of the document abutment portion 2b in the feeding direction F is set to 150 mm in consideration of the visibility when the document D is set, the present disclosure is not limited thereto.

As described above, the user sets document D in the first state where the document tray 2 is inclined to the front side. However, in a state where the document tray is 2 inclined to the front side, the ADF 1 cannot perform a feeding operation. Thus, after document D are set, the document tray 2 rotates while the document D is set on the document tray 2, to bring a position of the document abutment portion 2b to be higher than that in the first state illustrated in FIG. 3. More specifically, the document tray 2 rotates in a direction of an arrow C illustrated in FIG. 4. Thus, the document tray 2 shifts to a second state (the state in FIG. 4) where a level of the front side is almost the same as a level of the rear side. Then, the ADF 1 starts a feeding operation for the document D. In this operation, the document tray 2 rotates in response to a user's instruction for starting the reading operation from the operation unit 104.

According to the present exemplary embodiment, when viewed from the direction along the feeding direction F, the angle $\theta$ of the document stacking surface 2a with respect to the horizontal direction is set to zero degree when a feeding operation is started. However, it is sufficient that the document stacking surface 2a is smoothly connected with the conveyance path of the conveyance unit 12 at the time of when a feeding operation is started. Thus, when a feeding operation is started, the document stacking surface 2a may be slightly inclined with respect to the horizontal direction within a range where a feeding operation can be performed.

Widthwise Position of Rotating Shaft 11

Figure 5:
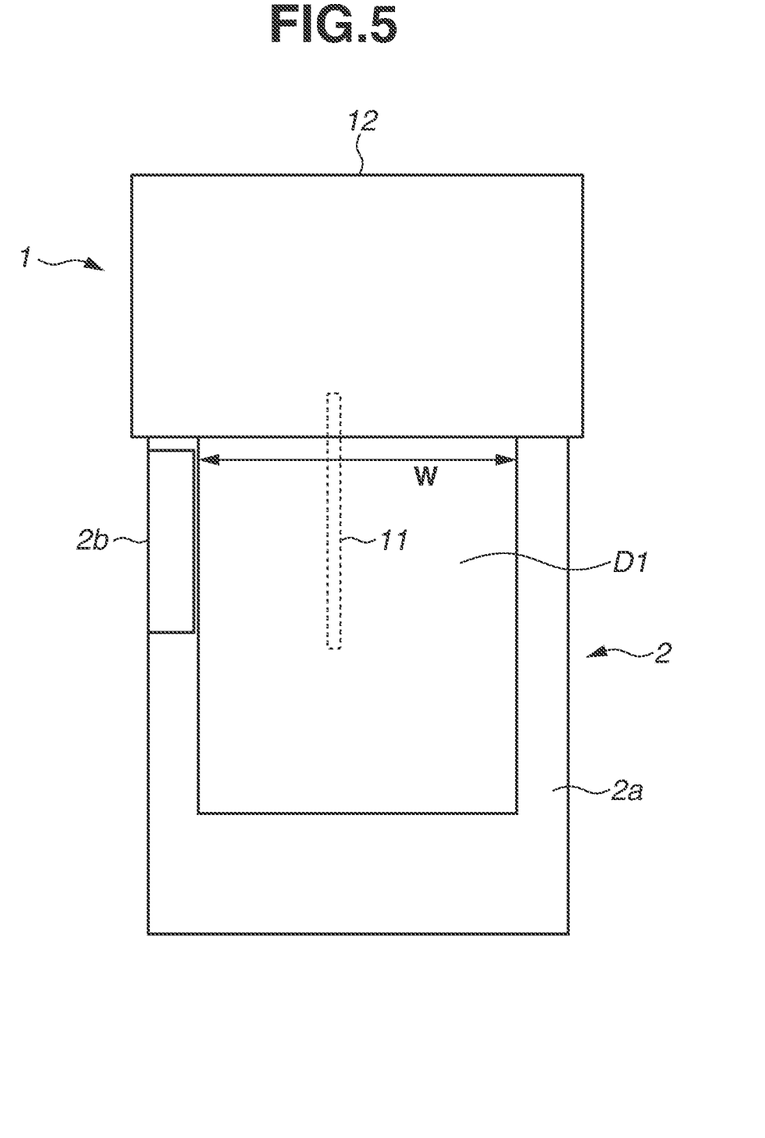
FIG. 5 is a top view illustrating an image reading apparatus according to the present disclosure.
Figure 6:
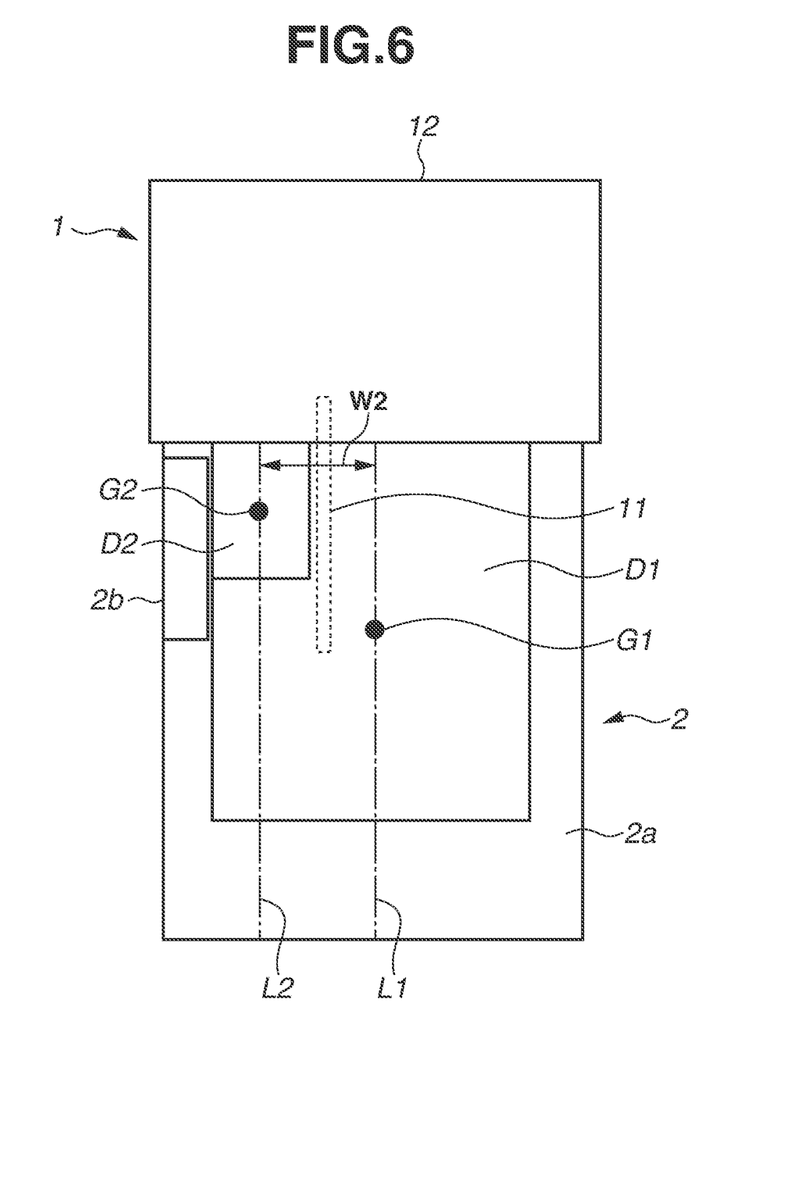
FIG. 6 is a top view illustrating the image reading apparatus according to the present disclosure.

A position of the rotating shaft 11 in the widthwise direction of the document tray 2 will be described below with reference to FIGS. 5 and 6. FIG. 5 is a top view illustrating the ADF 1 when a document D1 having a maximum width is stacked on the document tray 2. FIG. 6 is a top view illustrating the ADF 1 when the document D1 having a maximum width and a document D2 having a minimum width are stacked on the document tray 2. In FIGS. 5 and 6, the document tray 2 is in the second state (the state illustrated in FIG. 4), and the rotating shaft 11 inside the document tray 2 is drawn with broken lines. In FIG. 5, when the document D1 having a maximum width is set to the document tray 2, a region W indicates the range between both widthwise ends of the set document D1 having a maximum width. In FIG. 6, a region W2 indicates the range between a straight line L1 and a straight line L2. The straight line L1 is parallel to the feeding direction F and passes through the widthwise center of the document D1 having a maximum width, and a straight line L2 is parallel to the feeding direction F, passing through the widthwise center of the document D2 having a minimum width. The region W2 is included in the region W. The document D1 having a minimum width and the document D2 having a minimum width are documents in sizes having the maximum and minimum widths, respectively, among readable document sizes in specifications for the apparatus. More specifically, the document D1 having a maximum width and the document D2 having a minimum width are documents having the maximum and minimum widths, respectively, which can be conveyed by the conveyance unit 12. For the ADF 1 according to the present exemplary embodiment, the document D1 having a maximum width and the document D2 having a minimum width are A3 and B6 sizes, respectively.

As described above, the rotating shaft 11 supports the document tray 2 to be rotatable with respect to the conveyance unit 12. Further, as illustrated in FIG. 5, the rotating shaft 11 is disposed in the region W in the widthwise direction of the document tray 2. In other words, the rotating shaft 11 is disposed so that at least a part of the rotating shaft 11 exists between one widthwise end of the document D1 having a maximum width set to the document tray 2 and the other widthwise end opposite to the one widthwise end. Setting documents to the document tray 2 means that the documents are stacked on the document tray 2 in a state where one end of the documents abuts the document abutment portion 2b.

When the maximum number of documents D stackable on the document tray 2 specified in the specifications are set to the document tray 2, the weight of the documents D is larger than the weight of the document tray 2. However, according to the present exemplary embodiment, since the rotating shaft 11 is disposed in the region W, the position of the rotating shaft 11 is close to the center of gravity of the set documents D. Thus, even in a case where the document tray 2 is rotated in a state where a large number of documents D are set to the document tray 2, moment by the weight of the documents D can be reduced.

Sizes of documents set to the document tray 2 are different from user to user. As illustrated in FIG. 6, the position of the center of gravity of documents is largely different between a case where the document D1 having a maximum width is set to the document tray 2 and a case where the document D2 having a minimum width is set thereto. Accordingly, the magnitude of moment by documents is different between a case where the document D1 having a maximum width is set to the document tray 2 and a case where the document D2 having a minimum width is set thereto. Generally, the center of gravity G1 of the document D1 having a maximum width exists on the straight line L1, and the center of gravity G2 of the document D2 having a minimum width exists on the straight line L2. Thus, it is desirable that the rotating shaft 11 be disposed in the region W2 within the region W in the widthwise direction of the document tray 2. Disposing the rotating shaft 11 in this way enables reducing moment by the weight of documents D regardless of the size of documents D set to the document tray 2. This is because the rotating shaft 11 exists close to the center of gravity of the set documents D.

Second Exemplary Embodiment

Figure 7:
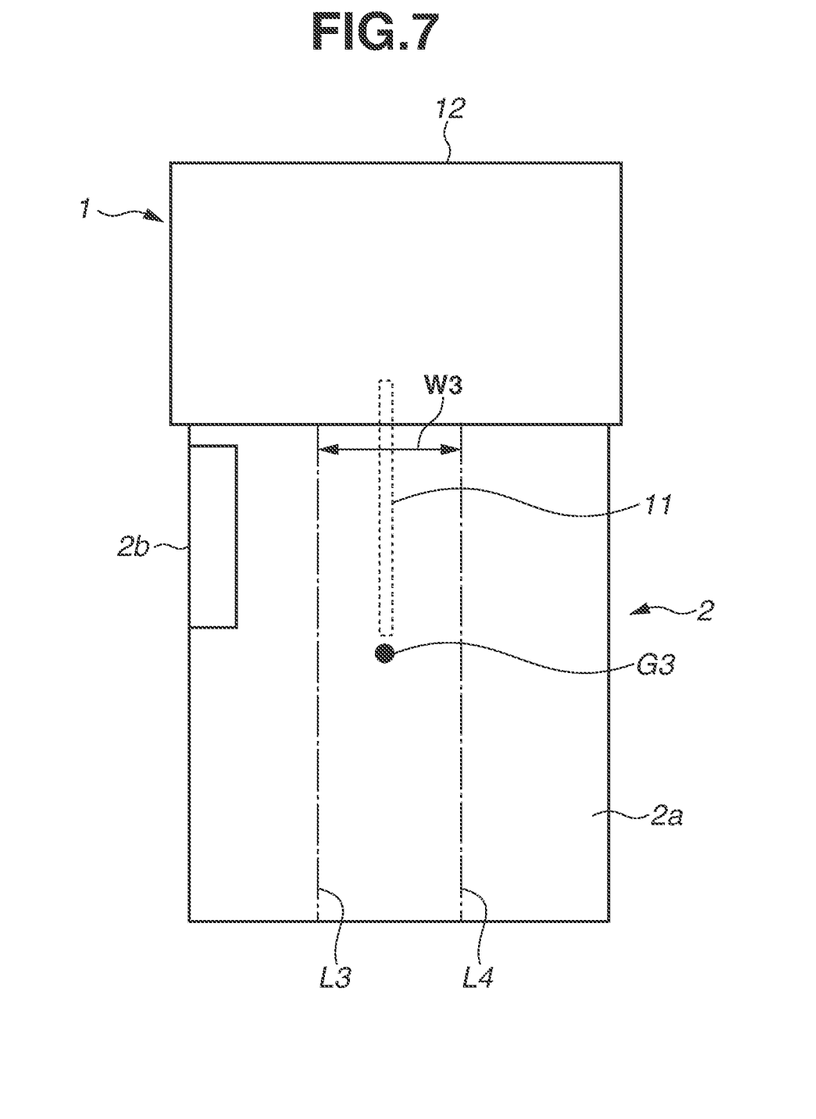
FIG. 7 is a top view illustrating the image reading apparatus according to the present disclosure.

Another example of a widthwise position of the rotating shaft 11 will be described below with reference to FIG. 7. FIG. 7 is a top view illustrating the ADF 1. In FIG. 7, a center region W3 indicates the range between straight lines L3 and L4 that trisect the maximum width of the document tray 2 in the widthwise direction.

The first exemplary embodiment has been described above centering on an example where the rotating shaft 11 is disposed at a position close to the center of gravity of documents D stacked on the document tray 2. In contrast, in the present exemplary embodiment, the rotating shaft 11 is disposed at a position close to the center of gravity G3 of the document tray 2. More specifically, as illustrated in FIG. 7, the rotating shaft 11 is disposed in the center region W3 in the widthwise direction of the document tray 2.

When a small number of documents D are set to the document tray 2, the weight of the documents D is smaller than the weight of the document tray 2. Thus, it is desirable that the rotating shaft 11 of the document tray 2 be disposed at a position close to the center of gravity of the document tray 2. As illustrated in FIG. 7, a position of the center of gravity G3 in the widthwise direction of the document tray 2 is close to the center of the maximum width of the document tray 2. Therefore, the center of gravity G3 of the document tray 2 is in the center region W3 among three different regions formed by trisecting the maximum width of the document tray 2. Thus, disposing the rotating shaft 11 in the center region W3 as in the present exemplary embodiment enables reducing moment by the weight of the document tray 2.

Further, to reduce moment by the weight of the document tray 2, it is desirable that the rotating shaft 11 be disposed so that at least a part of the rotating shaft 11 exists on a straight line that is parallel to the feeding direction F and passes through the center of gravity G3 of the document tray 2 in the widthwise direction of the document tray 2. According to the present exemplary embodiment, the maximum width of the document tray 2 is slightly larger than the width of the document D1 having a maximum width to prevent the document tray 2 from increasing in size more than necessary. Due to this configuration, the center region W2 of the document tray 2 and the center of gravity G3 of the document tray 2 are included in the region W illustrated in FIG. 5.

SUMMARY OF EXEMPLARY EMBODIMENTS

As described above, according to the first and the second exemplary embodiments, the rotating shaft 11 is disposed so that the position of the rotating shaft 11 in the widthwise direction is in the vicinity of the center of gravity of set documents D or the center of gravity of the document tray 2, whereby it is possible to reduce moment by the weight of the document tray 2 and the weight of documents D stacked on the document tray 2. This enables reducing a torque from the motor 13 to rotate the document tray 2. Accordingly, the document tray 2 can be rotated around the rotating shaft 11 without increasing the motor 13 in size more than necessary.

Although, in each of the above-described exemplary embodiments, the document abutment portion is fixed, the abutment portion may be configured to move in the widthwise direction. In this configuration, the center of gravity of the stacking unit refers to the center of gravity of the stacking unit in a state where the document abutment portion is at the position where a document having a maximum width abuts the abutment portion.

The configuration of the present disclosure makes is possible to reduce a torque for rotating the document tray, thus reducing the apparatus in size.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-095453, filed Jun. 1, 2020, which is hereby incorporated by reference herein in its entirety.

What is claimed is:
1. An image reading apparatus comprising:
   a stacking unit having a stacking surface on which a document is to be stacked, and an abutment portion on which an end of the document in a widthwise direction of the document stacked on the stacking surface abuts;

a feeding unit configured to feed the stacked document in a feeding direction perpendicularly intersecting the document widthwise direction;

a conveyance unit including a plurality of conveyance rollers configured to convey the document fed by the feeding unit;

a reading unit configured to read an image of the document conveyed by the conveyance unit;

a rotating shaft extended in the feeding direction and configured to rotatably support the stacking unit; and a drive unit configured to rotate the stacking unit around the rotating shaft, wherein, in the document widthwise direction, the rotating shaft is disposed at a position where at least a part of the rotating shaft exists between one end and other end in the document widthwise direction of a document having a maximum width conveyable by the conveyance unit in a state where the maximum width document abuts on the abutment portion.

2. The image reading apparatus according to claim 1, wherein a first straight line parallel to the feeding direction passes through a center in the document widthwise direction of the maximum width document when the maximum width document is stacked on the stacking unit with the one end of the maximum width document abutting the abutment portion, wherein a second straight line parallel to the feeding direction passes through a center in the document widthwise direction of a document having a minimum width conveyable by the conveyance unit when the minimum width document is stacked on the stacking unit with one end of the minimum width document abutting the abutment portion, and wherein, in the document widthwise direction, the rotating shaft is disposed at a position where at least a part of the rotating shaft exists between the first straight line and the second straight line.

3. The image reading apparatus according to claim 1, wherein, to shift from a first state where feeding cannot be performed by the feeding unit to a second state where a position of the abutment portion is higher than the position of the abutment portion in the first state and feeding can be performed by the feeding unit, a driving force of the drive unit causes the stacking unit to rotate around the rotating shaft.

4. The image reading apparatus according to claim 1, further comprising an operation unit configured to accept a reading start instruction, wherein the abutment portion is disposed on an operation unit side of the stacking unit.

5. The image reading apparatus according to claim 1, wherein the abutment portion is fixed to the stacking unit.

6. The image reading apparatus according to claim 1, wherein the drive unit is disposed in the conveyance unit.

7. An image reading apparatus comprising:

a stacking unit having a stacking surface on which a document is to be stacked, and an abutment portion on which an end of the document in a widthwise direction of the document stacked on the stacking surface abuts;

a feeding unit configured to feed the stacked document in a feeding direction perpendicularly intersecting the document widthwise direction;

a conveyance unit including a plurality of conveyance rollers configured to convey the document fed by the feeding unit;

a reading unit configured to read an image of the document conveyed by the conveyance unit;

a rotating shaft extended in the feeding direction and configured to support the stacking unit to be rotatable with respect to the conveyance unit; and a drive unit configured to rotate the stacking unit around the rotating shaft, wherein, in the document widthwise direction, the rotating shaft is disposed at a position where at least a part of the rotating shaft exists in a center region that is a region among regions of the stacking unit trisected in the document widthwise direction and includes a center of gravity of the stacking unit.

8. The image reading apparatus according to claim 7, wherein, in the document widthwise direction, the rotating shaft is disposed at a position where at least a part of the rotating shaft exists on a straight line that is parallel to the feeding direction and passes through the center of gravity of the stacking unit.

9. The image reading apparatus according to claim 7, wherein, to shift from a first state where feeding cannot be performed by the feeding unit to a second state where a position of the abutment portion is higher than the position of the abutment portion in the first state and feeding can be performed by the feeding unit, a driving force of the drive unit causes the stacking unit to rotate around the rotating shaft.

10. The image reading apparatus according to claim 7, further comprising an operation unit configured to accept a reading start instruction, wherein the abutment portion is disposed on an operation unit side of the stacking unit.

11. The image reading apparatus according to claim 7, wherein the abutment portion is fixed to the stacking unit.

12. The image reading apparatus according to claim 7, wherein the drive unit is disposed in the conveyance unit.

13. An image forming apparatus comprising:

a stacking unit having a stacking surface on which a document is to be stacked, and an abutment portion on which an end of the document in a widthwise direction of the document stacked on the stacking surface abuts;

a feeding unit configured to feed the stacked document in a feeding direction perpendicularly intersecting the document widthwise direction;

a conveyance unit including a plurality of conveyance rollers configured to convey the document fed by the feeding unit;

a reading unit configured to read an image of the document conveyed by the conveyance unit;

a rotating shaft extended in the feeding direction and configured to rotatably support the stacking unit;

a drive unit configured to rotate the stacking unit around the rotating shaft; and an image forming unit configured to form an image on a recording material based on the image read by the reading unit, wherein, in the document widthwise direction, the rotating shaft is disposed at a position where at least a part of the rotating shaft exists between one end and other end in the document widthwise direction of a document having a maximum width conveyable by the conveyance unit in a state where the maximum width document abuts on the abutment portion.

* * * * *